(12) United States Patent
Gilbert

(10) Patent No.: US 10,701,914 B2
(45) Date of Patent: Jul. 7, 2020

(54) FISHING LURE THAT MIMICS A BIRD IN DISTRESS

(71) Applicant: Ronnie James Gilbert, Ridgeland, SC (US)

(72) Inventor: Ronnie James Gilbert, Ridgeland, SC (US)

( * ) Notice: Subject to any disclaimer, the term of this patent is extended or adjusted under 35 U.S.C. 154(b) by 280 days.

(21) Appl. No.: 15/719,476

(22) Filed: Sep. 28, 2017

(65) Prior Publication Data

US 2019/0090464 A1    Mar. 28, 2019

(51) Int. Cl.
    *A01K 85/00*      (2006.01)
    *A01K 85/18*      (2006.01)

(52) U.S. Cl.
    CPC .............. *A01K 85/00* (2013.01); *A01K 85/18* (2013.01)

(58) Field of Classification Search
    CPC ........ A01K 85/00; A01K 85/10; A01K 85/12; A01K 85/16; A01K 85/18; A01M 31/06
See application file for complete search history.

(56) References Cited

U.S. PATENT DOCUMENTS

| | | | |
|---|---|---|---|
| 1,994,692 A | 3/1935 | Davenport | |
| 2,821,043 A * | 1/1958 | Parker, Jr. ............... | A01K 85/16 43/42.15 |
| 3,716,937 A * | 2/1973 | Santosuosso .......... | A01K 85/16 43/42.47 |
| 4,232,469 A | 11/1980 | Shiverdecker | |
| 5,490,347 A * | 2/1996 | Conley .................. | A01K 85/16 43/42.39 |
| 5,694,714 A | 12/1997 | Basso et al. | |
| 5,924,236 A | 7/1999 | Preston | |
| 6,701,662 B1 * | 3/2004 | Moore .................. | A01K 85/00 43/42.11 |
| 7,497,045 B1 * | 3/2009 | Crowe .................. | A01K 85/00 43/42 |
| 2008/0263934 A1 * | 10/2008 | Hanson ................. | A01K 85/00 43/42.06 |
| 2012/0096757 A1 * | 4/2012 | Langer .................. | A01K 85/00 43/42.24 |
| 2015/0040464 A1 * | 2/2015 | Kennedy ................ | A01K 85/00 43/42.1 |
| 2018/0070568 A1 * | 3/2018 | Ciacchi .................. | A01K 85/02 |

OTHER PUBLICATIONS

Jackall TV, Jackall Pompadour, Apr. 4, 2016 https://www.youtube.com/watch?v=O8LVwsaSUcs (Year: 2016).*

\* cited by examiner

*Primary Examiner* — Richard G Davis
(74) *Attorney, Agent, or Firm* — John G. Posa

(57) ABSTRACT

A fishing lure bait configured to attract fish which may include a body, a first wing arm and second wing arm. A stainless steel hooks molded to the body configured to couple to a plurality of fasteners, wherein the fasteners may be attached to the first and second wing arms. The fishing lure bait substantially covered by a clear UV protection for a lifetime usage.

9 Claims, 2 Drawing Sheets

FISHING LURE THAT MIMICS A BIRD IN DISTRESS

BACKGROUND OF INVENTION

Field of Invention

The present invention relates in general to mimic a distressed bird including a bent flexible element used as a fishing lure bait.

Description of Related Art

Fishing lures also referred to herein as fishing lure bait. In the past, various types of fishing lures attached a buoyant plug section which may have been used by a fisherman for catching fish.

SUMMARY OF THE INVENTION

The present invention provides a fishing lure bait which mimics a distressed bird.

In various representative aspects, the present invention may provide a fishing lure bait which may include a body, a first wing arm and a second wing arm, a plurality of stainless steel molded hooks on the body and the first and second wing arms, while a plurality of fasteners configured to attach to the plurality of stainless steel molded hooks, and a UV coating protection covering the fishing lure.

The fishing lure body having a first end, middle end and last end. The entire fishing lure may be made of luminilite. The plurality of fasteners may be configured to hooks, pins, nails, or screws, preferably a bronze steel treble hook. In one embodiment of the molded stainless steel hooks on the body, secures a fishing line to the head of the body. Another embodiment of the stainless steel hook may be molded on the bottom side of the body which may couple to at least one fastener. Whereas the stainless steel hooks molded to the middle end of the body coupling to the first wing arm and the second wing arm.

The first end of the body having a flat surface with a width of at least 0.5 inches. The first end of the body is configured to attach to the fasteners. Wherein the stainless steel hooks molded on the middle end of the body is configured to attach to the fastener. The fastener connected to the stainless steel hooks allows the first and second wing arms to flap and have mobility.

According to some example embodiment, the first wing arm and second wing arm may have a length of at least 1.875 inches and a width of at least 0.875 inches. The last end of the body may have a width of at least 1 inch and terminates at a semi-circular surface.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Figure 1:
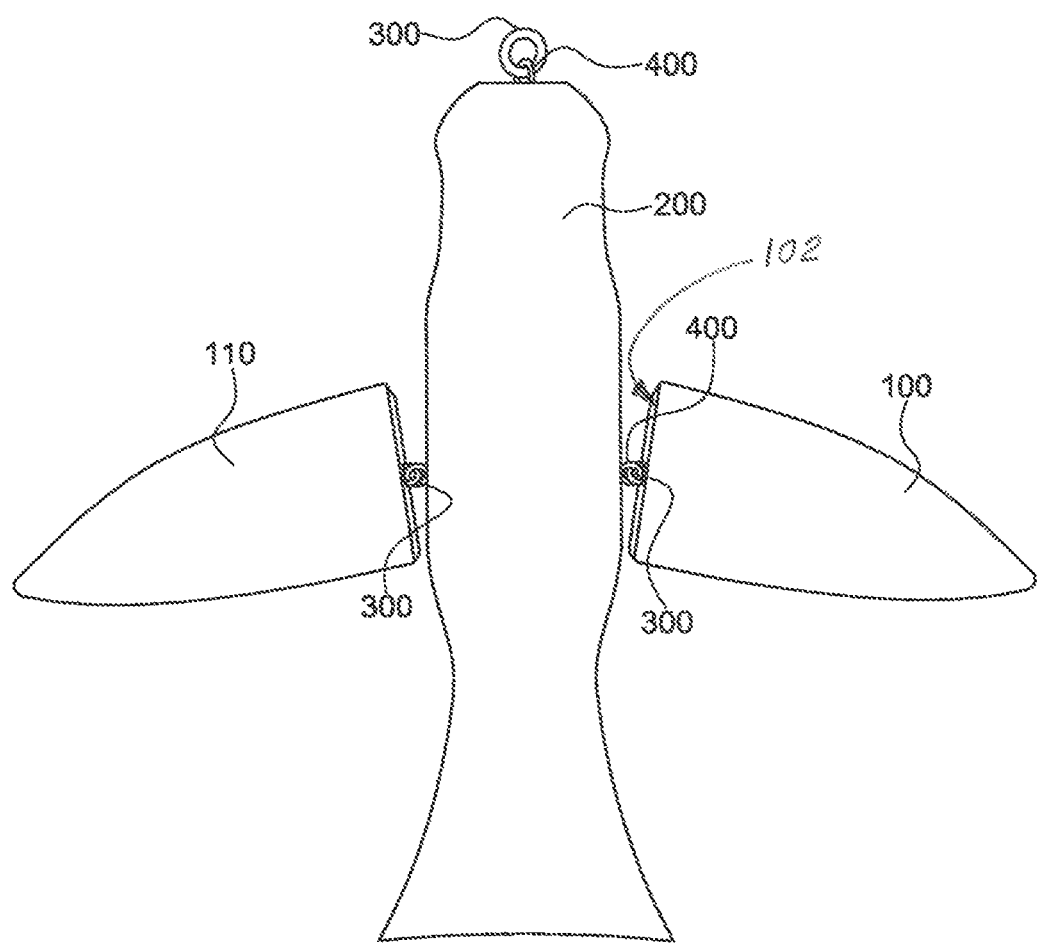
FIG. 1 representatively illustrates a top view of a body with stainless steel hooks molded to the body, a first wing arm, a second wing arm, and a plurality of fasteners.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

Intro

Some detailed example embodiments are disclosed herein. However, specific structural and functional details disclosed herein are merely representative for purposes of describing examples embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalent, and alternatives falling within the scope of example embodiments. Like numbers refer to like elements throughout the description of the figures.

It should be understood that when an element or layer is referred to as being "on", "connected to", "coupled to", or "covering" another element or layer, it may be directly on, connected to, coupled to, or covering the other elements or layer or intervening elements or layers may be present. In contrast, when an element is referred to as being "directly on", "directly connected to", or "directed coupled to another element or layer, there are no intervening elements or layer present. Like numbers refer to like elements throughout the specification. As used herein, the term "and/or" includes any and all combinations of one or more of the associated listed items.

It should be understood that, although the terms first, second, third, etc. may be used herein to describe various elements, regions, layer and/or sections, these elements, regions, layers, and/or section should not be limited by these terms. These terms are only used to distinguish one element, region, layer, or section discussed below could be termed a second element, region, layer, or section without departing from the teaching embodiments.

Spatially relative terms (e.g., "beneath", "below", "lower", "above", "upper", and the like) may be used herein for ease of description to describe one element or feature's relationship to another element(s) or feature(s) as illustrated in figures. It should be understood that the spatially relative terms are intended to encompass different orientations of the device in use or operation in addition to the orientation depicted in the figures. For example, if the device in the figures is turned over, elements describe as "below" or "beneath" other elements or features would then be oriented "above" the other elements or features. Thus, the term "below" may encompass both an orientation of above and below. The device may be otherwise oriented (rotated 90 degree or at other orientations) and the spatially relative descriptors used herein interpreted accordingly.

The terminology used herein is for the purpose of describing various example embodiments only and is not intended to be limiting of example embodiments. As used herein, the singular forms "a", "an", and "the" are intended to include the plural forms as well, unless the context clearly indicates otherwise. It will be further understood that the terms "includes", "including", "comprises", and/or "comprising" when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustration of idealized embodiments (and intermediate structures) of example embodiments. As such, variations from the shapes of the illustration as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

General

Various representative implementations of the present invention may be applied to any system for fishing using a lure bait. Certain representative implementations may include, for example: a body, a plurality of stainless steel hooks molded to the body, a first wing arm and a second wing arm, a plurality of fasteners configured to couple to the stainless steel hooks molded to the body, and a clear UV protection cover substantially the body, the first wing arm, the second wing arm and the plurality of fasteners.

Structure

Figure 2:
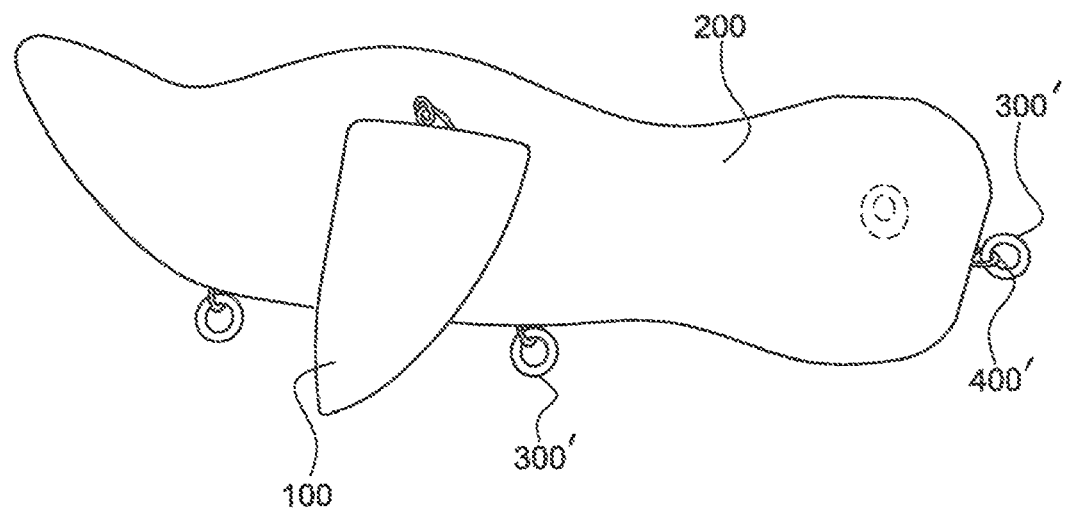
FIG. 2 representatively illustrates a side view of the body with a plurality of stainless steel hooks molded to the body, the second wing arm and a plurality of fasteners according to some embodiments.

FIG. 1 is a perspective view of the fishing lure bait comprising the body with a plurality of stainless steel hooks molded to the body, the first wing arm, the second wing arm, and the plurality of fasteners. FIG. 2 is a side view of the fishing lure bait which may mimic a bird in distressed.

Referring to FIG. 1, in some example embodiments, a body 200 comprises a first end, a middle end, and a last end. The stainless steel hooks 400 molded to the body 200 may be coupled to a plurality of fasteners 300 at least to the first end and middle end of the body 200. The fasteners coupled to the stainless steel hooks 400 molded to the body 200 to attach to at least a first wing arm 110 and a second wing arm 100 at the middle end of the body. As shown in FIG. 1, each wing arm is connected to the body 200 using a single pair of eyelets. For example, wing arm 100 is connected to the body 200 through a first eyelet 300 extending from inner surface 102 of wing arm 100, and a second eyelet 400 extending from the body 200. The eyelets 300, 400 are oriented at different angles to permit some movements while preventing others. In particular, eyelets 300, 400 allow up and down pivoting of wing arm 100, with the upper surface of wing arm 100 facing upwardly and the lower surface of wing arm 100 facing downwardly, while preventing wing arm rotation.

The stainless steel hooks 400 molded to the body 200 attached to the fasteners 300 coupling the first and second wing arms may give the illusion that the device mimics a bird such as but not limited to a duck, a hawk, an owl, a pigeon, a chicken, a humming bird or the like. The body 200, and the first and the second wing arms may comprise material selected from the group comprising luminilite, microballons, white wax, plastic, or base wood although other materials may be used, preferably luminilite. In some embodiments, the fasteners 300 may comprise pins, hooks, nails or screws.

As shown in FIG. 1. the first end of the body has a substantially flat and tapered surface which may have a width of at least 0.5 inches. Attached to the top end of the body may be any fastener, preferably an outtreble hook. For example the hook may attach to a fishing rode to help lure in potential fish. Another embodiment of FIG. 1 wherein the first wing arm 110 and the second wing arm 100 may have a width of at least 0.875 inches with a length of at least 1.875 inches. As depicted, the last end of body 200 terminates at an outward angle which may have a width of at least 1 inch.

FIG. 2 is a side view of the body 200, a plurality of fasteners 300', and the second wing arm 100. The stainless steel hooks 400' molded to the body 200 attached to the fasteners 300' may be used to hold the wing arms together, while allowing the first wing arm 110 and the second wing arm 100 to be mobile. The consistent movement of the first wing arm 110 and the second wing arm 100 may be designed to mimic a bird in distress. For example, when device is placed in a body of water the first and second wing arms are designed to move freely rippling the in the water at any slight movement of a fishing rod. The mimicked bird movement may look as if the bird in distress which is a replica of a food source for the fish and give a higher percentage in catching a fish.

Referring to FIG. 2 at least two fasteners may be coupled to the bottom of the body 200. These fasteners may be used to attach bronze steel treble hooks.

Another embodiment of device is the luminilite white wax which may be used to create the device. One benefit of this invention is the hand-painted clear coat with UV protection covering the body, and the wing arms. This coating may prevent the fishing lure from fading, making the device durable. In addition, the UV coating and luminilite white wax used will help the fishing lure bait to last a lifetime.

Another embodiment of the invention of the fishing bait is the 3D eyes molded on the first end of the body. The eye is beneficial to help better detect the wing in the correct direction. The mimicked bird movement may give the bird a realist look and the mobility may appear as if the "bird" is in distress which is a replica of a food source for the fish and give a higher percentage in catching a fish.

Closing

In the foregoing specification, the invention has been described with reference to specific exemplary embodiments. Various modifications and changes may be made, however, without departing from the scope of the present invention as set forth in the claims. The specification and figures are illustrative, not restrictive, and modifications are intended to be included within the scope of the present invention. Accordingly, the scope of the invention should be determined by the claims and their legal equivalents rather than by merely the examples described.

I claim:

1. A fishing lure that mimics a bird in distress, comprising:
   a body having a bottom surface, front and rear ends defining a length, and a midsection with opposing side surfaces defining a width;
   first and second symmetrical wing arms that extend outwardly from the opposing side surfaces of the body;
   wherein each wing arm is paddle-shaped, including upper and lower surfaces defining a thickness, an inner surface defining a length greater than the thickness, and a rounded, outward tip portion;

a single pair of fasteners connecting each wing arm to each respective side surface of the body, each single pair of fasteners including a first eyelet extending from the inner surface of each first wing arm, and a second eyelet extending from each opposing side surface of the body;

wherein the eyelets connecting each wing arm to the body are oriented at different angles such that the wing arms extend horizontally outwardly from the body, with the upper surface of each wing arm facing upwardly and the lower surface of each wing arm facing downwardly;

wherein the eyelets connecting each wing arm to the body a further facilitate a limited degree of up-and-down pivoting of each wing arm while preventing rotation thereof; and a plurality of additional eyelets molded to the body including a first eyelet on the front end of the body adapted for attachment to a line for pulling the lure in the water, and one or more eyelets on the bottom surface of the body adapted for attachment to fish hooks.

2. The fishing lure of claim 1, wherein the body, the first wing arm and the second wing arm are comprised of white aluminite, microballoons or base wood.

3. The fishing lure bait of claim 1, wherein the front end of the body has a substantially flat surface.

4. The fishing lure bait of claim 3, wherein the flat surface at the front end of the body has a width of at least 0.5 inches.

5. The fishing lure of claim 1, wherein the first wing arm and the second wing arm have a length of at least 1.875 inches.

6. The fishing lure of claim 1, wherein the first wing arm and the second wing arm have a width of at least 0.875 inches.

7. The fishing lure of claim 1, wherein the rear end of the body has a width of at least 1 inch.

8. The fishing lure of claim 7, wherein the rear end of the body is at an outward angle.

9. The fishing lure of claim 1, where the inner surfaces of the two wing arms are flat.

* * * * *